(12) United States Patent
Sato

(10) Patent No.: US 6,254,360 B1
(45) Date of Patent: *Jul. 3, 2001

(54) WATERPROOF STRUCTURE OF WASHER PUMP

(75) Inventor: Toshihiro Sato, Toyohashi (JP)

(73) Assignee: Asmo Co., Ltd., Shizuoka-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/459,601

(22) Filed: Dec. 13, 1999

(30) Foreign Application Priority Data

Dec. 14, 1998 (JP) .................................. 10-354465
Dec. 14, 1998 (JP) .................................. 10-354466

(51) Int. Cl.⁷ ...................................... F04B 17/00
(52) U.S. Cl. ............... 417/366; 417/360; 417/423.14; 417/423.1
(58) Field of Search .................... 417/366, 360, 417/313, 423.15, 423.14

(56) References Cited

U.S. PATENT DOCUMENTS 6,053,708 * 4/2000 Nishikawa ........................ 417/360
6,109,891 * 8/2000 Sato ............................. 417/432.14

FOREIGN PATENT DOCUMENTS 2-49657    4/1990  (JP) .
04129863   4/1992  (JP) .
05162618   6/1993  (JP) .

* cited by examiner

Primary Examiner—Teresa Walberg
Assistant Examiner—Vinod D Patel
(74) Attorney, Agent, or Firm—Nath&Associates PLLC; Harold L. Novick

(57) ABSTRACT

The washer pump includes a housing and a motor. The motor is accommodated in a motor chamber in the housing. The case of the motor includes a pair of opposed arcuate portions and a pair of opposed flat portions. The flat portions are inward of an imaginary circle circumscribing the motor. An internal passage is formed in the case to connect the interior of the case to the motor chamber. A drain structure is formed in the housing to connect the motor chamber to the exterior of the housing. The drain structure is in radial alignment with one of the flat portions. Also, the drain structure includes first, second, and third passages, which extend in different directions. The internal passage and the drain structure prevent the entrance of water into the washer pump and quickly drain water from the interior of the washer pump.

21 Claims, 5 Drawing Sheets

WATERPROOF STRUCTURE OF WASHER PUMP

BACKGROUND OF THE INVENTION

The present invention relates to a washer pump for a washer device that sprays cleaning liquid to the windshield of a vehicle. More specifically, the present invention relates to a structure that protects the motor of the washer pump from water.

A typical washer device for vehicles includes a tank for storing cleaning liquid and a washer pump for pumping the cleaning liquid from the tank to a washer nozzle. The washer pump has a housing including a motor chamber and a pump chamber. The motor chamber accommodates a direct current motor. The pump chamber includes an impeller. The motor has an output shaft that extends into the pump chamber. The impeller is fixed to the distal end of the output shaft. A seal is located about the output shaft to seal the motor chamber from the pump chamber. The motor rotates the impeller, which pumps the cleaning liquid from the tank to the washer nozzle.

The temperature of the motor increases when operating and decreases when stopped. Air in the motor chamber expands or contracts in accordance with the changes of temperature of the motor. When the motor chamber is sealed, contraction of air in the motor chamber draws the cleaning liquid from the pump chamber to the motor chamber between the output shaft and the seal. This may cause the motor to corrode and malfunction.

To solve the above problems, Japanese Unexamined Utility Model Publication No. 2-49657 describes a washer pump having an air hole open to the atmosphere. As shown in FIG. 7, a cylindrical washer pump 60 is attached to a side of a tank 63, which stores window cleaning liquid. A housing 64 of the pump 60 includes a motor case 70 and a pump case 67 attached to the lower part of the motor case 70. A motor chamber 66 for accommodating a motor 61 is formed in the motor case 70. A pump chamber 65 for accommodating an impeller 73 is formed between the motor case 70 and the pump case 67.

An output shaft 62 of the motor 61 extends vertically through the motor case 70 to the inside of the pump chamber 65. A seal 72 is located about the output shaft 62 to seal the motor chamber 66 from the pump chamber 65. The motor case 70 has an inlet 68 for introducing cleaning liquid from the tank 63 to the pump chamber 65. The pump case 67 has an outlet 69 for discharging cleaning liquid from the pump chamber 65. An air hole 71 connects the motor chamber 66 to the outside of the housing 64 near the lower end of the motor case 70 below the motor 61.

The air hole 71 prevents cleaning liquid from being drawn from the pump chamber 65 to the motor chamber 66. Even if cleaning water enters the motor chamber 64 due to a defect of the seal 72, the air hole 71 drains the cleaning liquid to the exterior of the motor chamber 66 and prevents the cleaning liquid from contacting the motor 61.

However, if the washer pump 60 is splashed by water while the vehicle runs through standing water, water may get in the motor chamber 66 through the air hole 71. This may cause a malfunction of the motor 61 and thus should be avoided.

Condensation of water may also occur due to temperature changes of the motor 61. The air hole 71 is not suitable for removing water condensation.

Further, most of the washer pump 60 is located outside the tank 63. This complicates the attachment of the washer pump 60 to the tank 63 and causes the washer pump 60 to be unstable.

It is possible to form a recess on a side wall of the tank 63 and fix the washer pump 60 in the recess with fasteners. However, this complicates the shape of the tank 63 and the installation of the pump 60. Also, this limits the shape of the tank 63, which complicates the tank 63 installation.

As shown in FIG. 8, Japanese Unexamined Patent Publication 4-129863 describes a washer pump 80, half of which is received in and fixed to a tank 81. A housing 82 of the pump 80 extends horizontally. An inlet 84 connected to a pump chamber 83 is formed in the distal end of the housing 80, which is located in the tank 81. A motor chamber is horizontally spaced from the pump chamber 83. The motor 86 rotates an impeller 87, which causes cleaning liquid in the tank 81 to flow through the inlet 84, a passage 88 in the housing 82, and through an outlet (not shown).

The pump 80 is received in and firmly fixed to the tank 81 without a complicated installation structure. Therefore, the shape of the tank 81 is simple and not limited.

However, since the motor chamber 85 is horizontally spaced from the pump chamber 83, if cleaning water in the pump chamber 83 enters the motor chamber 85, the horizontal motor 86 in the motor chamber 85 is immediately exposed to the leaked cleaning liquid. Even if an air hole that can drain the leaked cleaning liquid is provided in the motor chamber 85, the leaked cleaning liquid from the pump chamber will most likely contact the motor 86 before being drained. Therefore, in the pump 80 of FIG. 8, an air hole alone will not prevent the motor 86 from contacting cleaning liquid.

SUMMARY OF THE INVENTION

An objective of the present invention is to provide a washer pump that protects its motor from water and prevents motor malfunctions caused by water.

To achieve the above objective, the present invention provides a pump structured as follows. A housing includes a motor chamber. A motor is accommodated in the motor chamber. A motor-driven impeller draws in a liquid and pumps the liquid. An internal passage is formed in the motor for connecting the interior of the motor to the motor chamber. The internal passage is arranged to lead liquid from the interior of the motor to the motor chamber. A drain structure is formed in the housing radially outward of the internal passage to connect the motor chamber to the exterior of the housing. The drain structure is arranged to guide liquid from the motor chamber to the exterior of the housing. The drain structure includes passages that extend in at least two different directions.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
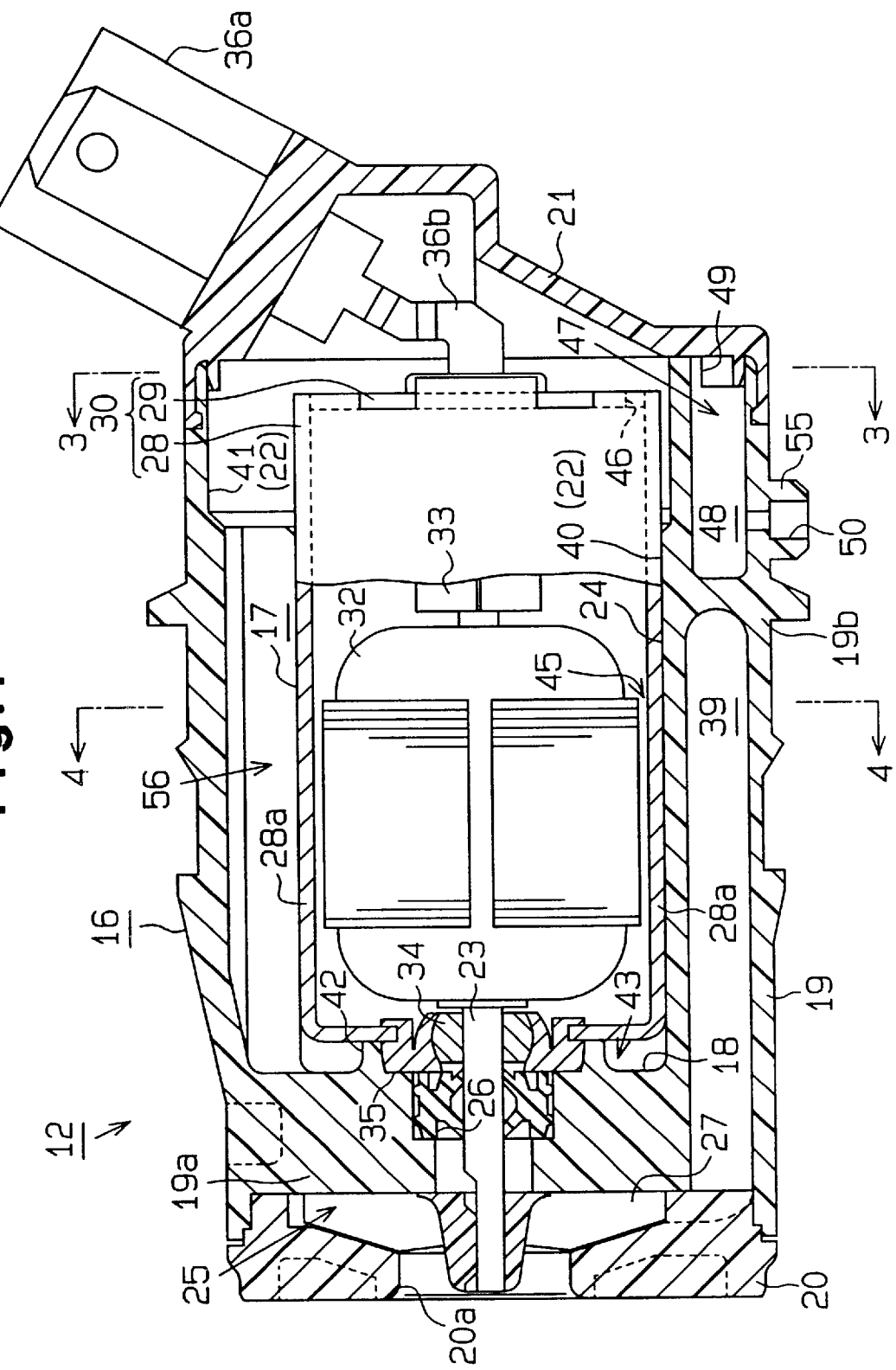
FIG. 1 is a cross sectional view of a washer pump according to one embodiment of the present invention.

One embodiment of the present invention will now be described with reference to FIGS. 1–4. FIG. 2 shows an entire washer device 10 for vehicles. The washer device 10 includes a tank 11 for storing cleaning liquid and a washer pump 12, which is attached to the tank 11. The washer pump 12 pumps cleaning liquid from the tank 11 to a washer nozzle (not shown).

The tank 11 is a generally rectangular parallelepiped and has a supply port 13 at the top. A vertical side wall 11a, which is recessed, is formed at the lower portion of the tank 11. An installation hole 14 for receiving the washer pump 12 is formed in the vertical side wall 11a. The washer pump 12 fitted in the installation hole 14 with a grommet 15 and the axis of the washer pump 12 extends horizontally. Approximately one half of the washer pump 12 is located in the tank 11 and the other half is located outside the tank 11.

Figure 2:
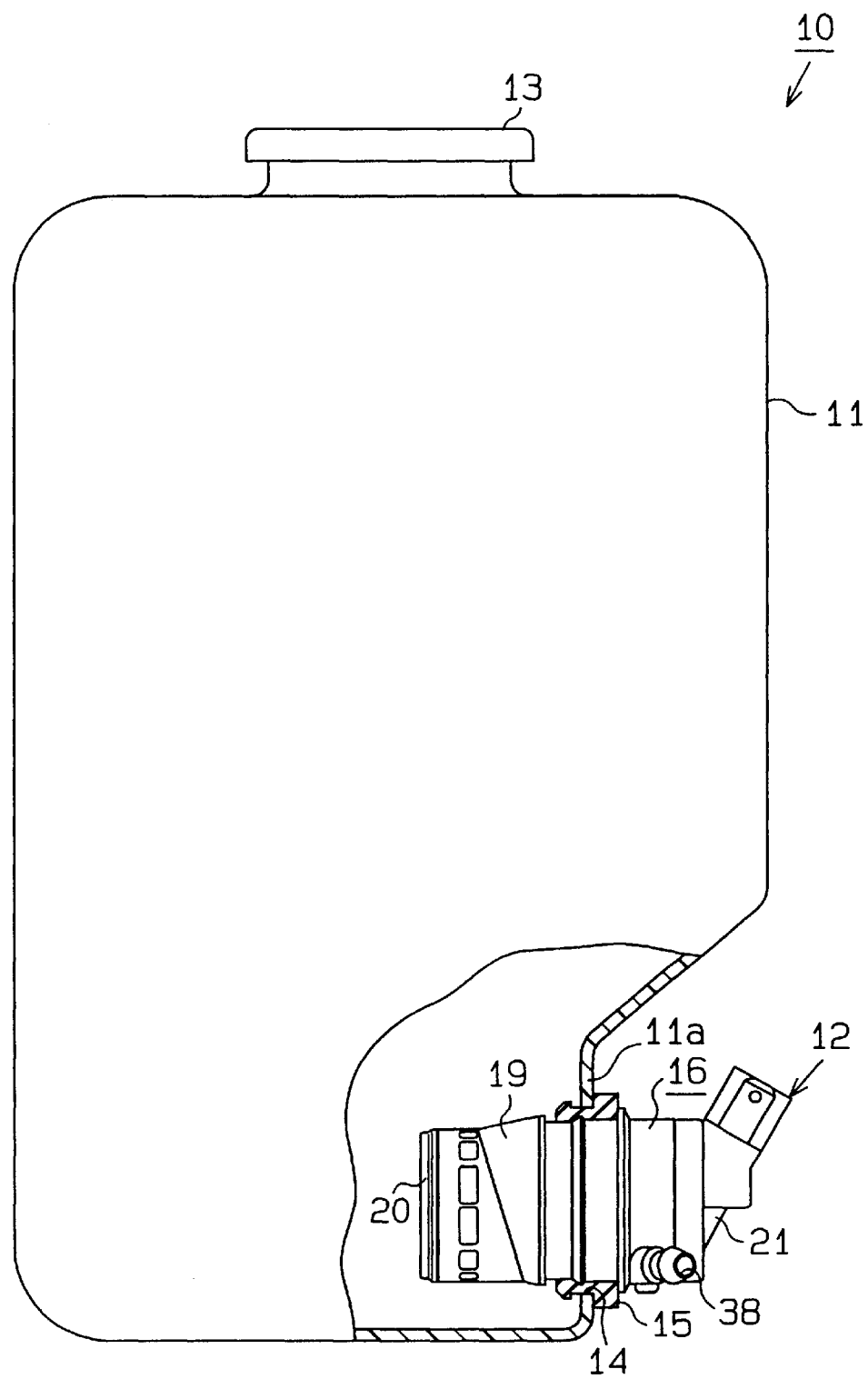
FIG. 2 is a partially cut away view of an entire washer device including the washer pump of FIG. 1.

As shown in FIG. 1, the washer pump 12 includes a generally cylindrical housing 16, a motor 17 located in the housing 16, and an impeller 27. The housing 16 is, for example, made of fiber-reinforced resin and includes a hollow cylindrical body 19, a pump case 20, and a lid 21. The pump case 20 engages a closed end of the cylindrical body 19 and the lid 21 engages an open end of the body 19. The closed end of the body 19 is located in the tank 11 and the open end of the body 19 is located outside the tank 11.

The lid 21 closes the open end of the body 19 and forms a motor chamber 24 in the body 19. The interior surface of the motor chamber 24, or the internal surface of the body 19 includes an internal circumferential surface 22 and an internal end surface 18. A motor 17, which is a DC motor, is fitted in the motor chamber 24.

A pump chamber 25, which accommodates the impeller 27, is formed between the closed end of the body 19 and the pump case 20. An output shaft 23 of the motor 17 passes through the closed end of the body 19, or through a partition 19a, and extends into the pump chamber 25. The partition 19a is located between the motor chamber 24 and the pump chamber 25. An impeller 27 is fixed to the distal end of the output shaft 23. A seal is located between the output shaft 23 and the partition 19a and seals the motor chamber 24 from the pump chamber 25. An inlet 20a for drawing cleaning liquid from the tank 11 to the pump chamber 25 is located in the central portion of the pump case 20.

Figure 3:
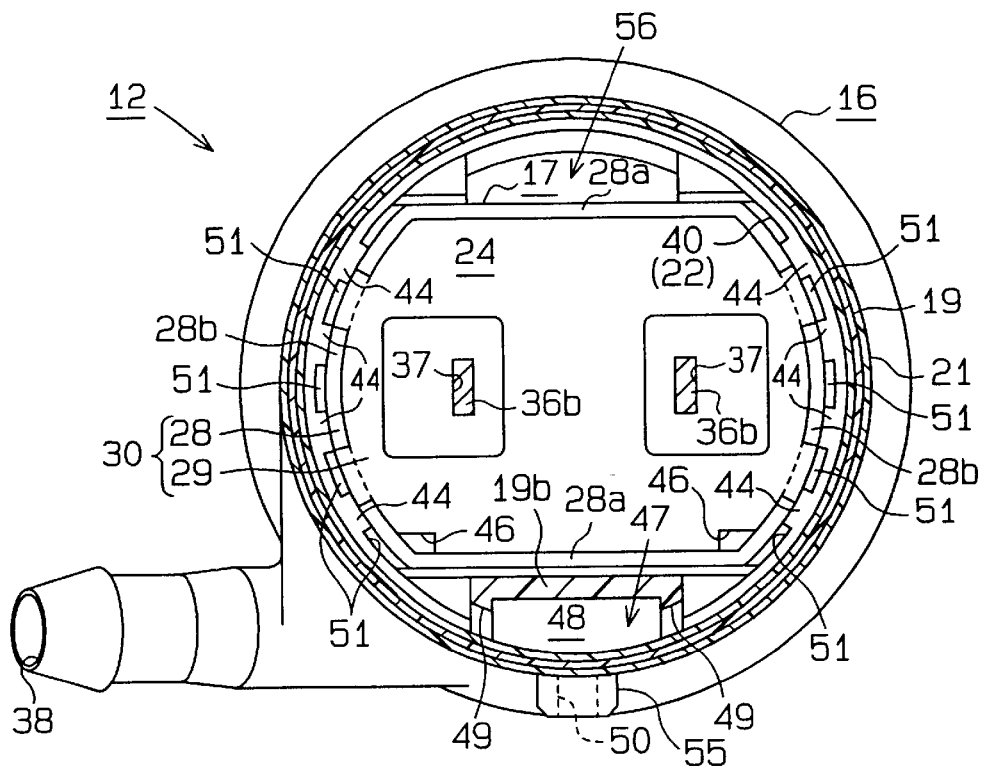
FIG. 3 is a cross sectional view taken along line 3—3 of FIG. 1.
Figure 4:
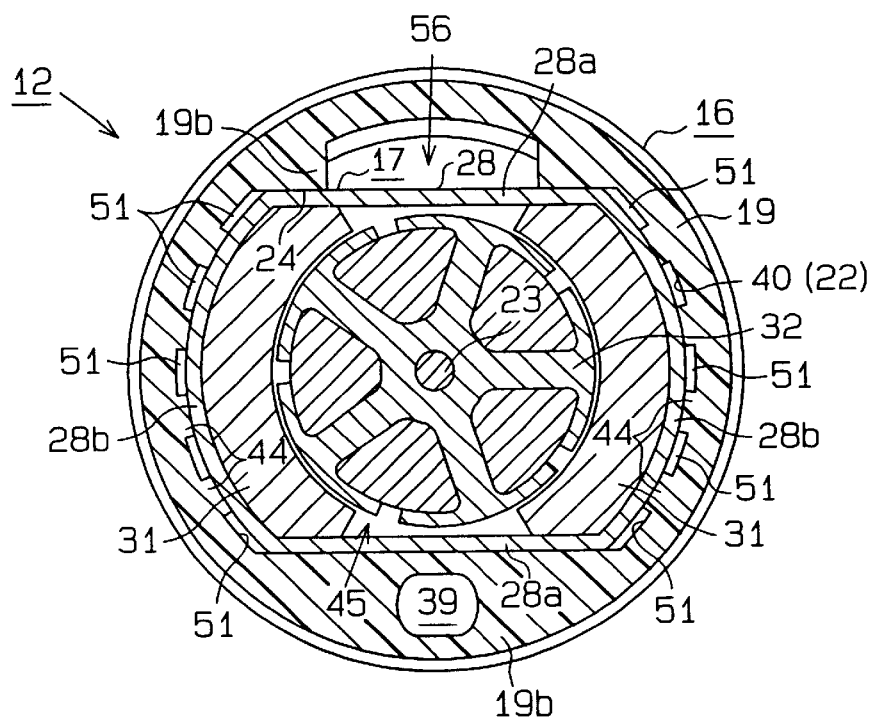
FIG. 4 is a cross sectional view taken along line 4—4 of FIG. 1.

A case for covering the motor 17 includes a tube 28 having an open end and a lid 29 closing the opened end of the tube 28. The tube 28 functions as a yoke. As shown in FIGS. 3 and 4, the tube 28 includes a pair of opposed flat walls 28a and a pair of opposed arcuate walls 28b. In other words, the cross sectional area of the motor 17 is shaped as if two opposite sides of a cylinder have been cut off. That is, the motor 17 has recessed portions (flat walls 28a), which are located inward of an imaginary circle centered on the axis of the motor and having a radius matching the maximum radius of the motor 17.

As shown in FIG. 4, the cross sectional shape of the motor chamber 24 substantially corresponds to the cross sectional shape of the motor 17. The body 19 of the housing 16 has thick portions 19b, which correspond to the flat walls 28a, or the recessed portions of the motor 17.

A pair of magnets 31 are fixed to the inner surfaces of the arcuate walls 28b in the case 30. The tube 28 magnetically connects the magnets 31. As shown in FIG. 1, an armature 32, which is made of an iron core and a coil, is surrounded by the magnets 31 in the case 30. A commutator 33 is also located in the case 30. The armature 32 and the commutator 33 are attached to the output shaft 23. A bearing 34 is attached to the closed end of the tube 28 through a holder 35. The bearing 34 rotatably supports the output shaft 23.

A connector 36a for supplying electric power is formed on the outer surface of the lid 21 of the housing 16. The connector 36a includes a pair of terminals 36b, which extend into the housing 16. As shown in FIG. 3, the terminals 36b are respectively received in a pair of connection ports 37, which are formed in the lid 29 of the motor 17. The terminals 36b are connected to a brush (not shown) located in the motor 17 through the connection ports 37.

As shown in FIGS. 2 and 3, the housing 16 includes an outlet 38 for discharging cleaning liquid. As shown in FIGS. 1 and 4, the housing 16 also includes a discharge passage 39 for connecting the pump chamber 25 to the outlet 38. The discharge passage 39 extends in the axial direction of the motor 17 in the body 19 of the housing 16, or in the lower thick portion 19b. At least part of the discharge passage 39 is located inward of the imaginary circle mentioned previously, as seen in FIG. 4.

As shown in FIG. 1, the inner surface 22 of the body 19 includes a fitting portion 40 and a large diameter portion 41. The large diameter portion 41, the diameter of which is greater than that of the fitting portion 40, is located in the vicinity of the open end of the body 19. An annular projection 42 is formed on the end surface 18 of the body 19. The projection 42 engages the holder 35. An annular space 43 is formed between the inner surface of the body 19 and the outer surface of the motor 17.

As shown in FIGS. 3 and 4, projections 44, which extend in the axial direction of the motor 17, are formed on the fitting surface 40 at equal angular intervals to face the arcuate walls 28b of the motor 17. The projections 44 contact the arcuate walls 28b. The projections 44 define longitudinal passages 51 between the fitting surface 40 and the arcuate walls 28b. The longitudinal passages 51 extend in the axial direction of the motor 17. The longitudinal passages 51 between the motor 17 and the housing 16 connect the front space 43 of the motor chamber 24 to a rear space (corresponding to the large diameter surface 41) of the motor chamber 24.

As shown in FIGS. 1 and 4, an upper passage 56, which extends in the axial direction of the housing 16, is formed in the upper thick portion 19b of the body 19. Like the longitudinal passages 51, the upper passage 56 connects the front space 43 of the motor chamber 24 to the rear space of the motor chamber 24.

As shown in FIG. 4, a clearance 45 is formed between the lower flat wall 28a of the tube 28 and the armature 32. The clearance 45 is larger than the space between the armature 32 and the magnets 31. The size of the clearance 45 is determined such that water, which may enter the case 30 or which may collect due to condensation, is prevented from remaining between the armature 32 and the magnets 31.

As shown in FIGS. 1 and 3, notches 46 are formed at the lower ends of the lid 29. The notches 46 function as internal passages for connecting the interior of the case 30 to the motor chamber 24. The notches 46, or internal passages 46, are open at the lowest part of the case 30, that is, at the height of the inner surface of the lower flat wall 28a. The internal passages 46 lead water in the case 30 to the motor chamber 24 to prevent water from remaining in the case 30.

As shown in FIGS. 1 and 3, a drain structure 47, which connects the motor chamber 24 to the exterior of the housing 16, is formed in the housing 16. The drain structure 47 leads water in the motor chamber 24 to the exterior of the housing 16 to prevent water from remaining in the motor chamber 24. The drain structure 47 is located below the internal passages 46 and the longitudinal passages 51 and is located at the lowest part of the motor chamber 24.

The drain structure 47 includes a first, or main, passage 48, a pair of second, or inlet, passages 49, and a third, or outlet, passage 50. The parts of the drain structure 47 respectively extend in different directions. The first, or main, passage 48 is formed in the lower thick portion 19b of the body 19 and extends in an axial direction of the housing 16. The second, or inlet, passages 49 extend along the circumference of the housing 16 and connect the motor chamber 24 to one end of the main passage 48. The third, or outlet, passage 50 extends radially and connects an inner end of the main passage 48 to the exterior of the housing 16. The outlet passage 50 is formed in a tube 55, which extends downward from the body 19 of the housing 16.

At least one part of the drain structure 47 is located inward of the imaginary circle that circumscribes the motor 17. In FIG. 3, one part of the main passage 48 is located inward of the imaginary circle that circumscribes the motor 17.

When the motor 17 rotates the impeller 27, cleaning liquid in the tank 11 is drawn to the pump chamber 25 through the inlet 20a. Then cleaning liquid in the pump chamber 25 is sent to the washer nozzle (not shown) through the discharge passage 39 and the outlet 38.

The illustrated washer pump has the following advantages.

The internal space of the motor 17, or the internal space of the case 30, is connected to the rear space (corresponding to the large diameter portion 41) of the motor chamber 24 through the internal passages 46. Also, the front space 43 of the motor chamber 24 is connected to the rear space of the motor chamber 24 through the passages 51, 56. Further, the rear space of the motor chamber 24 is connected to the exterior of the housing 16 through the drain structure 47.

Accordingly, the internal space of the motor 17 and the motor chamber 24 are continuously open to the atmosphere. There is no space in the washer pump that is sealed from the atmosphere. This prevents cleaning liquid in the tank 11 from being drawn to the internal space of the motor 17 or to the motor chamber 24 through the pump chamber 25 by pressure differences. In this way, the internal passages 46, the passages 51, 56, and the drain structure 47 serve as air passages.

Even if cleaning liquid enters the internal space of the motor 17 (the internal space of the case 30) from the pump chamber 25 due to a defect of the seal 26, the cleaning liquid is led to the rear space of the motor chamber 24 through the internal passages 46. The cleaning liquid in the rear space then flows to the exterior of the housing 16 through the drain structure 47. When condensation occurs in the internal space of the motor 17, the condensation water is drained to the exterior of the housing 16 through the internal passages 46, the rear space of the motor chamber 24, and the drain structure 47.

Even if cleaning liquid enters the front space 43 of the motor chamber 24 from the pump chamber 25, the cleaning liquid flows to the rear space of the motor chamber 24 through the longitudinal passages 51, especially through the lowest two longitudinal passages 51. Water from condensation in the front space of the motor chamber 24 is also led to the rear space of the motor chamber 24 through the longitudinal passages 51. Cleaning liquid and condensation water are drained from the rear space of the motor chamber 24 to the exterior of the housing 16 through the drain structure 47.

In this way, the internal passages 46, the longitudinal passages 51, and the drain structure 47 drain water from the internal space of the washer pump 12. This prevents significant amounts of the cleaning liquid and condensation water from collecting in the internal space of the washer pump 12.

The inlet passages 49 of the drain structure 47 are located below the internal passages 46 and the longitudinal passages 51 and are open at the lowest part of the motor chamber 24. Therefore, cleaning liquid and condensation water flow to the drain structure 47 from the internal passage 46 or from the longitudinal passages 51 through the motor chamber 24.

The clearance 45 is formed at the lowest portion in the case 30, that is, between the lower flat wall 28a of the tube 28 and the armature 32. The clearance 45 is larger than the space between the armature 32 and the magnets 31. The internal passage 46 is open at the lowest portion in the case 30, that is, at the height of the internal surface of the lower flat wall 28a.

Accordingly, cleaning liquid and condensation water in the case 30 collect in the clearance 45 and flow to the motor chamber 24 through the internal passages 46. The clearance 45 and the internal passages 46 prevent electric parts including the armature from being exposed to cleaning liquid and condensation water. In that sense, the clearance 45 serves as a discharge passage in the case 30.

Figure 8:
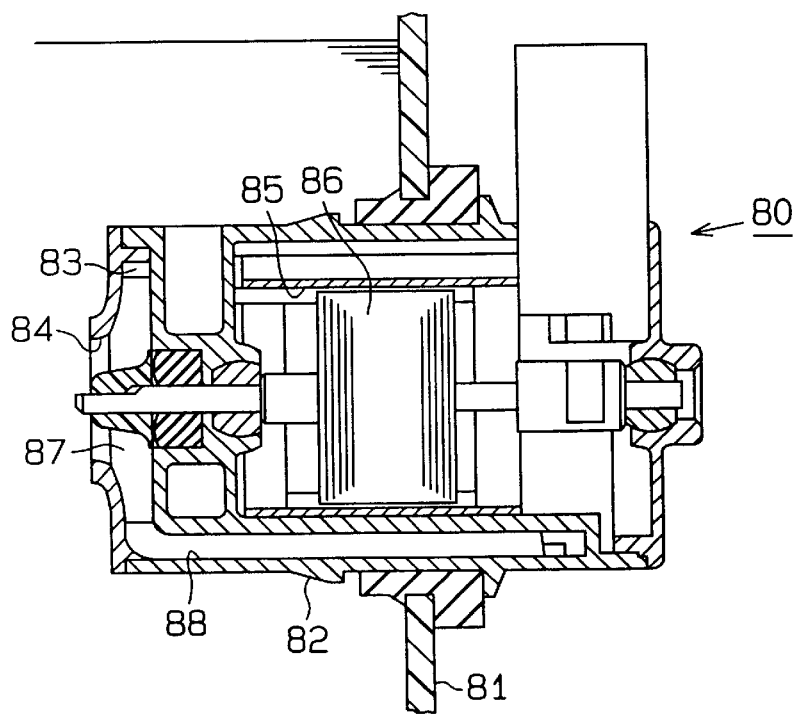
FIG. 8 is a cross sectional view showing another prior art washer pump.

The washer pump 12 of the present embodiment like the prior art pump 80 of FIG. 8, is horizontally arranged such that the motor chamber 24 is horizontally adjacent to the pump chamber 25. However, in the present embodiment, if cleaning liquid and condensation water pass through the case 30, the clearance 45 prevents the electric parts from contacting the water.

The electric parts of the motor 17 are accommodated in the case 30, which is independent from the housing 16. The longitudinal passages 51 are formed between the case 30 and the housing 16 that accommodates the case 30. Accordingly, cleaning liquid and condensation water are led to the drain structure 47 along the outer surface of the case 30 without entering the case 30. This, together with the clearance 45, protects the electric parts from water.

The longitudinal passages 51 are defined by the projections 44, which retain the motor 17 in the motor chamber 24. That is, the projections 44 serve as a support for the motor 17 and a member for defining the longitudinal passages 51. This simplifies the structure of the washer pump 12.

The drain structure 47, which is open to the exterior of the housing 16, includes the main, inlet, and outlet passages 48, 49, 50, which respectively extend in different directions. Accordingly, if the washer pump 12 is splashed by water, water does not reach the motor chamber 24 and the internal space of the motor 17.

The main passage 48, which forms part of the drain structure 47, extends in an axial direction of the housing 16. Also, the inlet passages 49 are connected to one end of the main passage 48, and the outlet passage 50 is connected to the other end of the main passage 48. In other words, the inlet passages 49 and the outlet passage 50 not only extend in different directions but are relatively distant from each other. This prevents water from entering the motor through the drain structure 47.

Most of the drain structure 47 is formed in the lower thick portion 19b of the body 19 such that at least part of the drain structure 47 is inward of the imaginary circle circumscribing the motor 17. In other words, the drain structure 47 is located to correspond to the lower flat wall 28a of the motor 17. The thick portion 19b is formed in a space not used by the motor 17. The internal space of the washer pump 12 is effectively used by forming most of the drain structure 47 in unused space, which makes the pump 12 compact. Since the main passage 48 is formed in the thick portion 19b, the main passage 48 can be relatively long without increasing the size of the washer pump 12.

The discharge passage 39 is formed in the lower thick portion 19b like the drain structure 47 such that at least part of the discharge passage 39 is inward of the imaginary circle circumscribing the motor 17.

Figure 5:
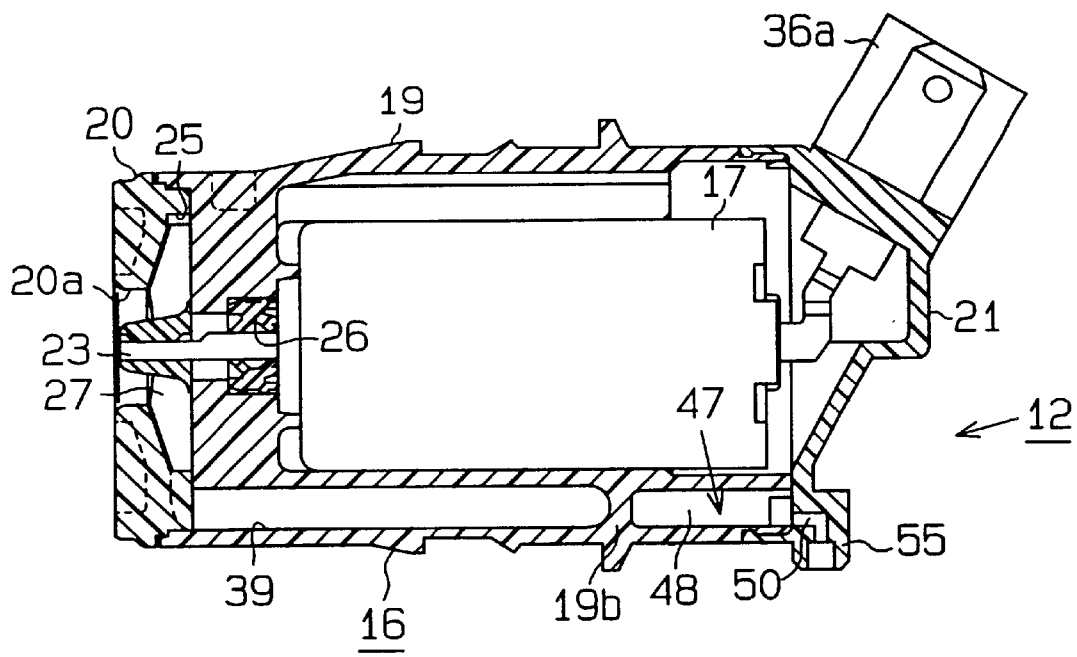
FIG. 5 is a cross sectional view of a washer pump according to another embodiment of the present invention.
Figure 6:
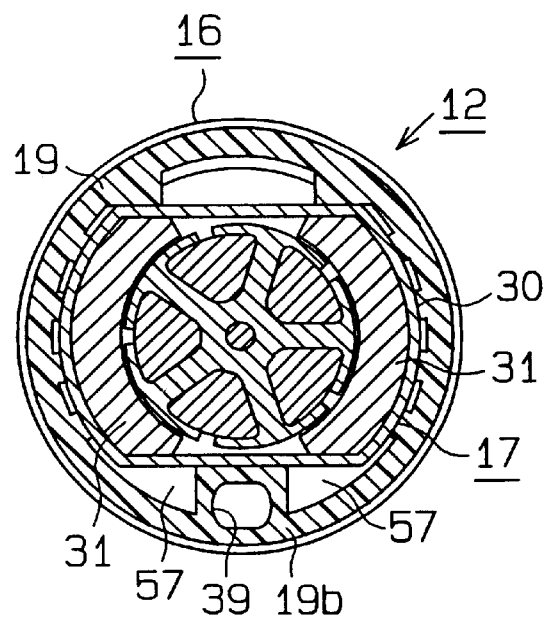
FIG. 6 is a cross sectional view of a washer pump according to a further embodiment of the present invention.

FIGS. 5 and 6 respectively show further embodiments.

In the embodiment of FIG. 5, the structure of the drain structure 47, in particular, the structure of the outlet passage 50 is different from that of the first embodiment shown in FIGS. 1–4. That is, the outlet passage 50 is formed in the lid 21 of the housing 16. The tube 55 that includes the outlet passage 50 extends downward from the lid 21. The outlet passage 50 includes a horizontal section and a vertical section. The horizontal section is connected to and extends in the same direction as the main passage 48, and the vertical section extends downward from the horizontal section. In other words, the outlet passage 50 is downwardly bent at its middle portion.

The drain structure 47 of FIG. 5 is also branched in three different directions like the drain structure 47 shown in FIGS. 1 and 3. Accordingly, the embodiment of FIG. 5 has the same advantages as the embodiment of FIGS. 1–4. In the embodiment of FIG. 5, the drain structure 47 is open at the outermost portion of the housing 16. Therefore, most of the washer pump 12 is received in the tank 11.

In the embodiment of FIG. 6, instead of or in addition to the passages 51, 56 shown in FIGS. 3 and 4, a pair of lower passages 57 are formed in the lower thick portion 19b of the body 19. The lower passages 57 connect the front space 43 of the motor chamber 24 to the rear space of the motor chamber 24. The lower passages 57 are respectively located at the ends of the discharge passage 39. One of the lower passages 57 may be omitted.

The illustrated embodiments may be varied as follows.

The housing 16 need not include the body 19, the pump case 20, and the lid 21. For example, the housing 16 may be formed by two housing members, which are divided along an axial plane. The housing 16 may also be formed by more than two members.

Only one internal passage 46 may be formed. The internal passage 46 may be formed in an arbitrary portion of the case 30 of the motor 17, for example, in the tube 28 instead of the lid 29.

The case 30 may includes another internal passage in addition to the internal passages 46 shown in FIG. 3. In this case, air is introduced to the interior of the case 30 through another internal passage as water is drained through the internal passages 46 of FIG. 3. This facilitates the drainage of the case 30.

The directions in which the drain structure 47 extends are not limited to the radial, axial, and circumferential directions of the housing 16. The drain structure 47 may branch in any direction.

The drain structure 47 may have any shape as long as it is not a single straight passage and at least part of it bends. That is, the drain structure 47 should bend to extend in two directions. For example, the main passage 48 may be omitted and the inlet passages 49 may be directly connected to the outlet passage 50. The main passage 48 may be a curved passage instead of a straight passage. Further, the shape of the drain structure 47 may be arcuate.

The drain structure 47 does not have to bend at a right angle; it may bend at an obtuse angle. A plurality of branches of the drain structure 47 may respectively have different angles. The drain structure 47 may bend sharply or gently to form an arcuate curve.

The total of the angles of the drain structure 47 is preferably greater than ninety degrees. If the total of the angles is greater than 150 degrees, the entrance of water into the housing 16 is more than likely prevented. If the total of the bent angles is greater than 180 degrees, the entrance of water into the housing 16 is more positively prevented.

The main passage 48 may extend below the front space 43 of the motor chamber 24 and the front space 43 may be directly connected to the main passage 48.

The outlet passage 50 may be tapered toward the exterior of the housing 16. In this case, the entrance of water into the housing is more positively prevented.

An independent pipe may be arranged in the internal space of the housing 16 to form at least part of the drain structure 47.

The motor 17 does not have to have the flat walls 28a and may be cylindrical.

Figure 7:
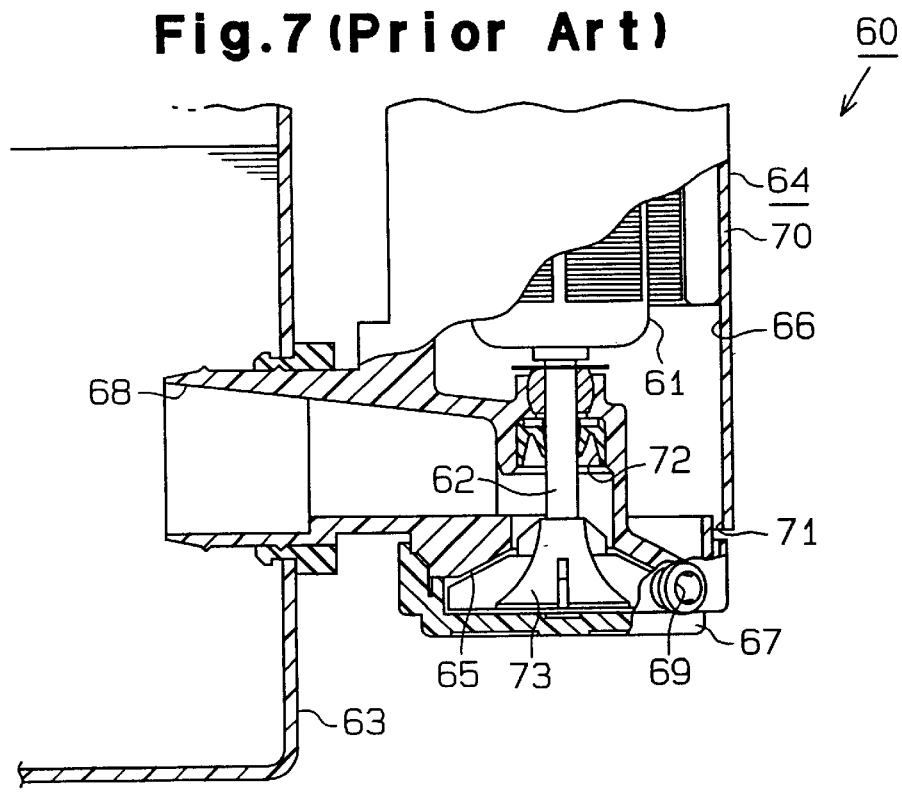
FIG. 7 is a side view, partially in cross section, showing a prior art washer pump.

As shown in FIG. 2, the washer pump 12 is horizontally attached to the lower side wall 11a of the tank 11. However, the orientation of the washer pump 12 relative to the tank 11 is not limited. For example, the washer pump 12 may be attached to the bottom surface of the tank 11 to extend vertically. In this case, it is preferred that the drain structure 47 opens downwardly to the exterior of the housing 16. The washer pump 12 of the present invention may be oriented in a manner like that shown in FIG. 7. Further, the washer pump 12 of the present invention need not be attached to the tank 11 but may be connected to the tank 11 by a conduit.

The present examples and embodiments are to be considered as illustrative and not restrictive and the invention is not to be limited to the details given herein, but may be modified within the scope and equivalence of the appended claims.

What is claimed is:

1. A pump comprising:

a housing, which includes a motor chamber;

a motor accommodated in the motor chamber;

a motor-driven impeller for drawing in a liquid and pumping the liquid;

an internal passage formed in the motor for connecting the interior of the motor to the motor chamber, wherein the internal passage is arranged to lead liquid from the interior of the motor to the motor chamber; and a drain structure, which is formed in the housing radially outward of the internal passage to connect the motor chamber to the exterior of the housing, wherein the drain structure is arranged to guide liquid from the motor chamber to the exterior of the housing, wherein the drain structure includes passages that extend in at least two different directions.

2. The pump according to claim 1, wherein the drain structure includes first, second, and third passages that extend respectively in different directions.

3. The pump according to claim 2, wherein the first passage extends in the axial direction of the housing, the second passage extends in the circumferential direction of the housing, and the third passage extends in the radial direction of the housing.

4. The pump according to claim 3, wherein the motor includes a recessed portion, which is inward of an imaginary circle that circumscribes the motor, wherein the drain structure is radially aligned with the recessed portion, and at least part of the first passage is within the imaginary circle.

5. The pump according to claim 1, wherein the motor includes a recessed portion, which is inward of an imaginary circle that circumscribes the motor, wherein the drain structure is radially aligned with the recessed portion, and at least part of the drain structure is within the imaginary circle.

6. The pump according to claim 1, wherein the motor includes a recessed portion, which is inward of an imaginary circle that circumscribes the motor, wherein the housing includes a discharge passage through which liquid flows from the impeller, wherein the discharge passage is radially aligned with the recessed portion such that at least part of the discharge passage is located within the imaginary circle.

7. The pump according to claim 5, wherein the motor includes a case that houses the motor, wherein the case has an internal surface, which includes a first wall corresponding to the radially maximum periphery of the motor and a second wall corresponding to the recessed portion, wherein an armature is rotatably arranged in the case, a magnet is attached to the first wall to face the armature, wherein a gap exists between the armature and the magnet, and a clearance, which is larger than the gap, is formed between the armature and the second wall, wherein the internal passage is open to the interior of the case at the height of the second wall.

8. The pump according to claim 1, wherein the motor includes a case that houses the motor, an armature rotatably arranged in the case, a magnet attached to the case to face the armature, wherein a gap exists between the armature and the magnet, and a clearance, which is larger than the gap, is formed between the armature and a certain internal surface of the case, wherein the internal passage is open to the interior of the case at the height of the certain internal surface.

9. The pump according to claim 1, wherein the housing includes an internal surface defining the motor chamber, wherein the motor includes an external surface facing the internal surface, wherein a longitudinal passage connected to the drain structure is formed between the internal surface of the housing and the external surface of the motor.

10. The pump according to claim 9, wherein the housing includes a pump chamber for accommodating the impeller and a wall for separating the motor chamber from the pump chamber, wherein an output shaft extends from the motor through the wall to the pump chamber and is connected to the impeller, wherein a seal is located between the wall and the output shaft, wherein the motor divides the motor chamber into a first space adjacent to the seal and a second space connected to the drain structure, wherein the longitudinal passage connects the first space to the second space.

11. The pump according to claim 9, wherein the internal surface of the housing includes a plurality of radial projections that extend in an axial direction of the housing to contact the external surface of the motor, wherein the longitudinal passage is formed between an adjacent pair of the projections.

12. The pump according to claim 9, wherein the motor includes a recessed portion located within an imaginary circle circumscribing the motor, wherein the longitudinal passage is in radial alignment with the recessed portion.

13. A pump comprising:
 a housing, wherein the housing includes a motor chamber and a pump chamber, which are separate from each other;
 a motor accommodated in the motor chamber, wherein the motor includes a case that houses the motor, wherein the case includes a recessed portion that is inward of an imaginary circle circumscribing the motor;
 an impeller accommodated in the pump chamber, wherein the impeller is driven by the motor to draw in and force out liquid;
 an internal passage formed in the case to connect the interior of the case to the motor chamber, wherein the internal passage is arranged to guide liquid from the interior of the case to the motor chamber; and
 an drain structure, which is formed in the housing radially outward of the internal passage to connect the motor chamber to the exterior of the housing, wherein the drain structure is arranged to guide liquid from the motor chamber to the exterior of the housing, wherein the drain structure is in radial alignment with the recessed portion and at least part of the drain structure is within the imaginary circle, wherein the drain structure includes first, second, and third passages, which extend in different directions, respectively.

14. The pump according to claim 13, wherein the first passage extends in the axial direction of the housing, the second passage extends in the circumferential direction of the housing, and the third passage extends in the radial direction of the housing.

15. The pump according to claim 14, wherein at least part of the first passage is located within the imaginary circle.

16. The pump according to claim 13, wherein the housing includes a discharge passage through which liquid flows from the impeller, wherein the discharge passage is in radial alignment with the recessed portion and at least part of the discharge passage is located within the imaginary circle.

17. The pump according to claim 13, wherein the case has an internal surface including an arcuate surface and a flat surface, wherein the flat surface corresponds to the recessed portion, wherein an armature is rotatably located in the case, and a magnet is attached to the arcuate surface to face the armature, and a gap exists between the armature and the magnet, wherein a clearance, which is larger than the gap, is formed between the armature and the flat surface, wherein the internal passage opens to the interior of the case at the height of the flat surface.

18. The pump according to claim 13, wherein the housing includes an internal surface defining the motor chamber and the case includes an external surface facing the internal surface, wherein a longitudinal passage connected to the drain structure is formed between the internal surface of the housing and the external surface of the case.

19. The pump according to claim 18, wherein the housing includes a wall separating the motor chamber from the pump chamber, wherein an output shaft extends from the motor to the pump chamber through the wall and is connected to the impeller, wherein a seal is located between the wall and the output shaft, wherein the motor divides the motor chamber into a first space adjacent to the seal and a second space connected to the drain structure, wherein the longitudinal passage connects the first space to the second space.

20. The pump according to claim 18, wherein the internal surface of the housing includes a plurality of radial projections that extend in an axial direction of the housing to contact the external surface of the case, wherein the longitudinal passage is formed between an adjacent pair of the projections.

21. The pump according to claim 18, wherein the longitudinal passage is radially aligned with the recessed portion.

* * * * *